Jan. 28, 1969

A. W. KLOMP 3,423,879

GEAR GRINDING MACHINE

Filed Sept. 2, 1965

INVENTOR.
ALFRED W. KLOMP
BY Whittemore,
Hulbert & Belknap
ATTORNEYS

United States Patent Office 3,423,879
Patented Jan. 28, 1969

3,423,879
GEAR GRINDING MACHINE
Alfred W. Klomp, Detroit, Mich., assignor of twenty-five percent to Norman L. Goddard, Birmingham, Mich., and twenty-five percent to James K. Fulks, Detroit, Mich.
Filed Sept. 2, 1965, Ser. No. 484,603
U.S. Cl. 51—5
Int. Cl. B24b 7/00, 9/00, 5/00
20 Claims

ABSTRACT OF THE DISCLOSURE

A gear grinder comprising a grinding wheel in the form of a worm, a diamond type abrasive trimmer including individual trimming elements mounted for rotation about the axis of the work spindle and in helical alignment with teeth thereof to provide for a consecutive trimming and grinding operation on movement of the work spindle in a single direction.

---

The present invention relates to a high production gear grinding machine.

It is an object of the present invention to provide a gear grinding machine employing a grinding wheel in the form of an enveloping worm.

It is a further object of the present invention to provide a gear grinding machine including trimming means movable with the work supporting spindle movable in trimming relation with respect to the wheel intermediate each gear finishing cycle.

It is a further object of the present invention to provide a gear grinding machine including a work spindle, wheel trimming elements secured to the spindle, and an expanding arbor at the end of the spindle.

It is a further object of the present invention to provide a spindle having an expanding arbor portion at one end to engage and support a work gear, and having wheel trimming elements spaced axially of the spindle, the portion of the spindle intermediate the trimming elements and the expanding arbor having teeth similar to but smaller than the teeth of the work gear.

It is a further object of the present invention to provide in a gear finishing machine of the character described, mechanism for locating a work gear accurately on a spindle.

Other objects and features of the invention will become apparent as the description proceeds, especially when taken in conjunction with the accompanying drawings, illustrating a preferred embodiment of the invention, wherein.

Before referring specifically to the drawings the overall arrangement of the improved high production gear grinding machine will be described. Essentially, the invention comprises a grinding wheel in the form of an enveloping worm which has a small number of starts. In some cases a single-start worm may be used. The work gear is supported and driven in properly timed relation on a spindle and is advanced axially relative to the wheel which is rotated to give a surface speed appropriate for efficient grinding. The gear, normally a relatively small pinion, is rotated at substantial speed as it is advanced axially and the rate of advance is sufficiently slow so that the grinding operation of all teeth is completed in a single pass.

If the gear is helical, an appropriate lead guide mechanism is employed so that additional rotational movement is superimposed on the timed rotation required for correct meshing engagement with the teeth of the grinding wheel.

Mounted on the spindle which supports the work gear is wheel trimming mechanism which in the present instance comprises a plurality of appropriately shaped trimming elements. These elements are of generally conical configuration with the side surface shaped to appropriate form as for example an involute shape, and the side surfaces of these elements are impregnated with diamonds. As the spindle advances the trimming elements through the zone of the wheel, the trimming elements generate the required form on the wheel.

After each gear finishing operation there is provided a depth feed between the wheel and work spindle and trimmer to remove a required amount from the grinding wheel after each gear grinding cycle. In some cases of course, it may be possible to grind more than one gear with a single trimming operation, but in general it is anticipated that the wheel will be trimmed once during each gear grinding cycle.

It is of course necessary that the work gear be located on the spindle in exact location with respect to rotation so as to engage properly with the teeth of the grinding wheel. For this purpose the tool supporting spindle has at its end an expanding arbor and associated with it is locating means engageable with guide structure on the arbor and with the teeth of the work gear to insure exactly proper location.

While the present machine is illustrated for simplicity as essentially a manually operated machine, it will of course be apparent that it may easily be automated and provided with automatic loading and unloading mechanism for a series of work gears.

Figure 2:
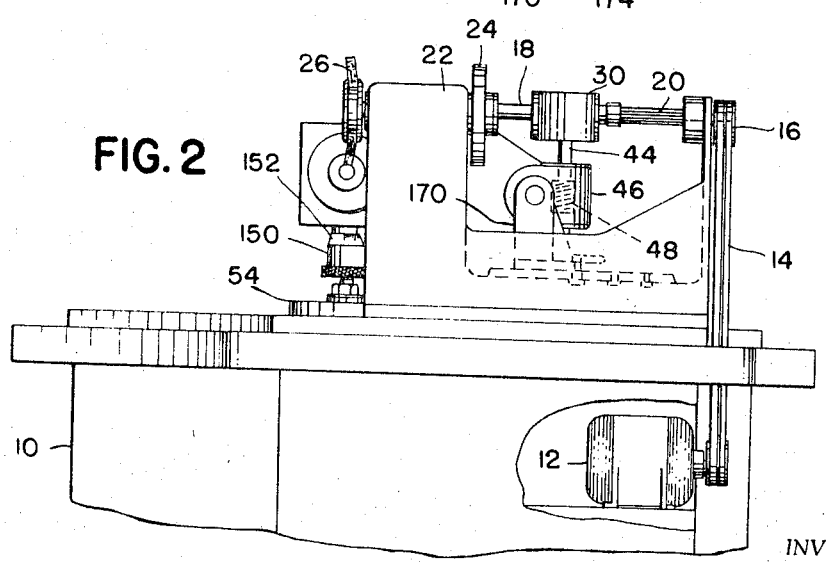
FIGURE 2 is a fragmentary front elevation of the machine.
Figure 13:
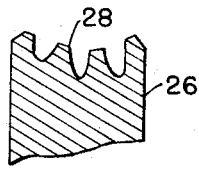
FIGURE 13 is an enlarged fragmentary radial section of a grinding wheel used in the present machine.

Referring now specifically to the drawings, the machine comprises a base 10 carrying the main drive motor 12 connected by suitable belting 14 to a sheave 16 connected to a main drive shaft 18 having a spline portion 20. The spindle or drive shaft 18 extends through housing 22 which is mounted on the top of the base 10. The spindle 18 has suitably connected thereto a flywheel 24 and at its outer end carries the grinding wheel 26, which as best seen in FIGURE 2 may be of saucer shape. As previously noted, and as best illustrated in FIGURE 13, the wheel 26 has its periphery formed as an enveloping worm with appropriately shaped teeth 28 formed to provide one or a limited number of starts.

Figure 11:
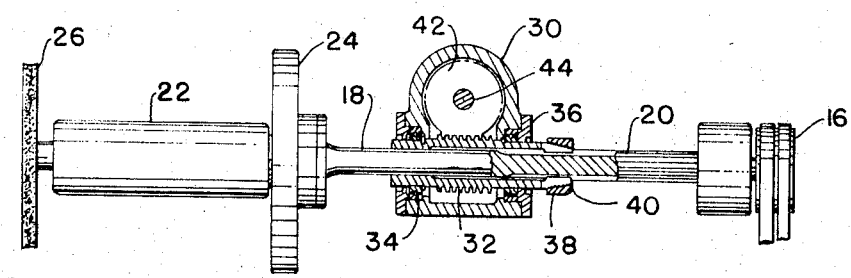
FIGURE 11 is a fragmentary plan view of the wheel driving structure with parts in section.

Referring now to FIGURE 11 there is provided a gear box 30 having a through opening receiving a worm 32 journaled in the gear box 30 by bearings 34 retained in place by removable closures 36. The worm 32 is tubular and surrounds the shaft 18 and at one end, as indicated at 38, has an internal splined formation adapted to interfit with the spline portion 20 of the shaft 18. The splined end of the worm 32 is slotted and provided with a tapered threaded end cooperating with a corresponding tapered clamping nut 40 which forces the splines on the end of the worm into firm engagement with the splines on the shaft 18. In the gear box 30 is provided a worm gear 42 in mesh with the worm 32 and connected to a shaft 44 extending downwardly from the gear box as best seen in FIGURE 2.

The spindle or shaft 18 is supported for rotation in an elongated bearing intermediate the flywheel 24 and the grinding wheel 26.

Figure 1:
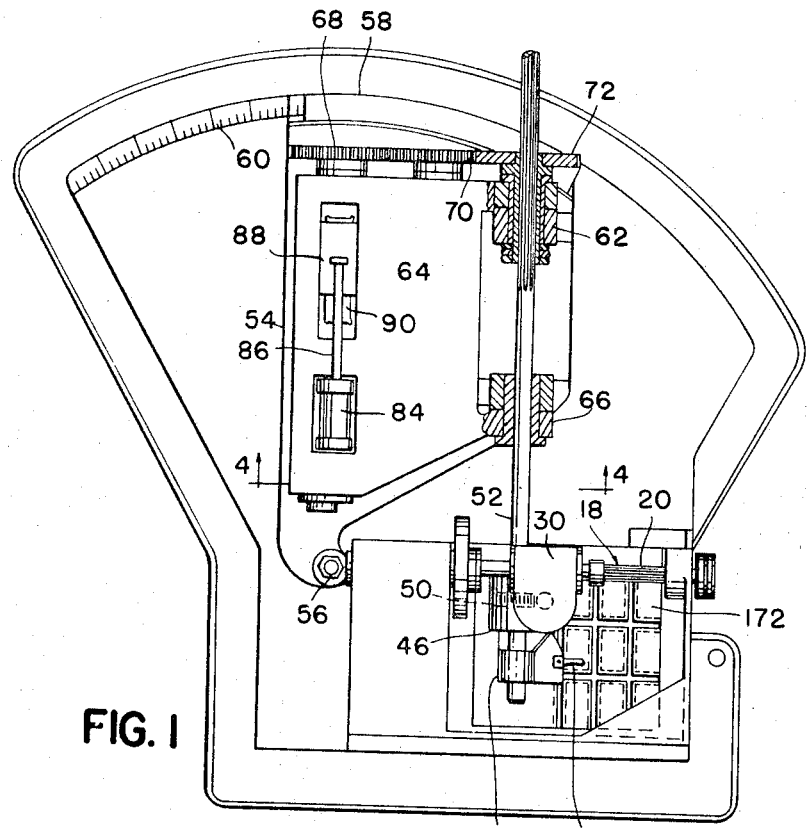
FIGURE 1 is a plan view partly in section of a gear grinding machine constructed in accordance with the present invention.
Figure 3:
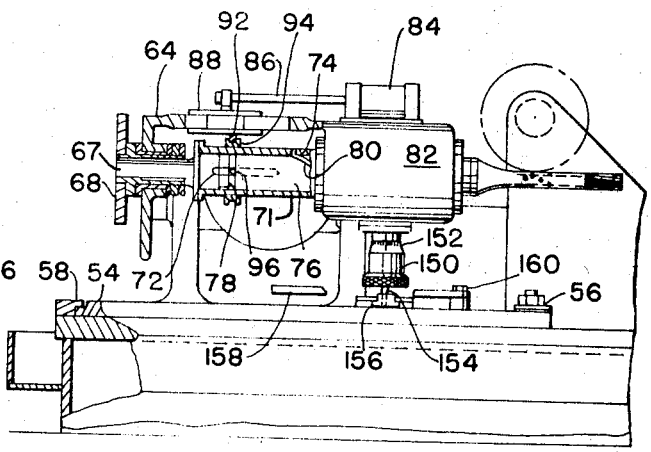
FIGURE 3 is a fragmentary side elevational view of the machine shown in FIGURE 1.

Referring now to FIGURE 2 there is shown a second gear box 46, in all respects identical with the gear box 30, and containing a worm indicated at 48 carried by the shaft 44. The gear box 46 contains a worm gear shown in dotted lines at 50 in FIGURE 1. Supported on the upper surfaces of the base 10 is a mounting plate 54 which as best seen in FIGURES 1 and 3, is connected to the base for swivelling movement in a horizontal plane by a pivot mounting indicated at 56. The outer edge of the plate 54 is arcuate and is received under an arcuate retainer segment 58. Indicia indicated at 60 on the table serves to indicate the angularity of the plate 54.

The plate 54 is provided with two upwardly extending ears 62 and swivelled to these ears is a work spindle casting 64, the casting being in the form of a plate having ears 66 and affording the pivot connection to the ears 62.

The work spindle casting 64, as best seen in FIGURE 3, has a shaft 67 journaled therein carrying a drive gear 68 which through an intermediate idler 70 is driven from a drive gear 72 splined to the drive shaft 52.

Referring again to FIGURE 3, the shaft 67 is connected in driving relation to a sleeve 71 which is provided with an elongated slot 72 and a radially inwardly projecting pin 74. Slidably received in the sleeve 71 is the enlarged cylindrical end of the work spindle 76 provided with an annular groove 78 and a helical groove 80 which receives the radially inwardly projecting pin 74.

The work spindle casting 64 includes an enlarged housing portion 82 which has suitable bearings therein for the work spindle 76. Mounted on the top of the housing 82 is a cylinder 84 containing a piston therein connected to a piston rod 86 which in turn connects to a slide 88 movable longitudinally in an elongated opening 90 provided in the top wall of the work spindle casting 64, as best seen in FIGURE 1. The slide 88 includes a depending finger 92 which enters into the channel of a ring 94 which is U-shaped in cross-section. The ring 94 includes a radially inwardly projecting finger 96 which extends through the elongated slot 72 and into the annular groove 78 in the end of the work spindle.

The construction just described provides for gear driven rotation of the work spindle and axial reciprocation thereof in which case additional angular movement is imparted by the projecting pin 74 and the helical slot 80. It will be understood of course that the inclination of the slot 80 is appropriate to compensate for helical teeth on a work piece and correspondingly arranged trimming elements on the work spindle.

Figure 7:
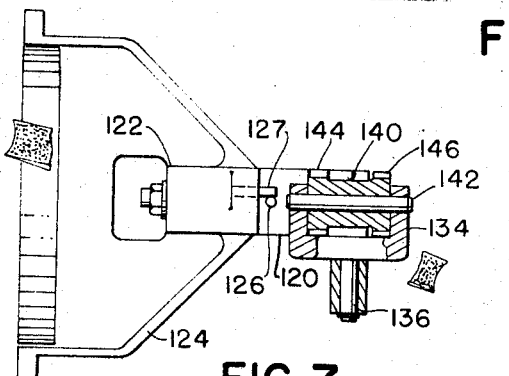
FIGURE 7 is a plan view of the structure shown in FIGURE 5 with parts in section.
Figure 5:
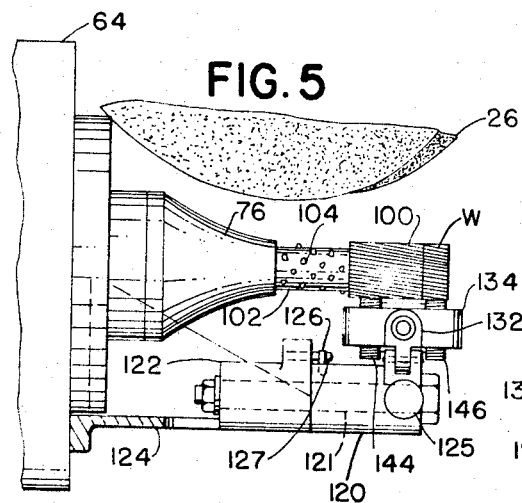
FIGURE 5 is an enlarged fragmentary elevational view showing the work supporting and wheel trimming mechanism and the work locating mechanism.
Figure 6:
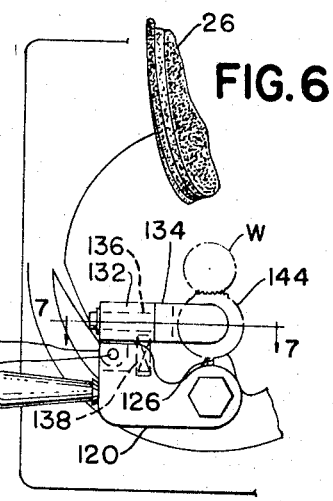
FIGURE 6 is a side elevational view of the structure shown in FIGURE 5.
Figures 8, 9, 10:
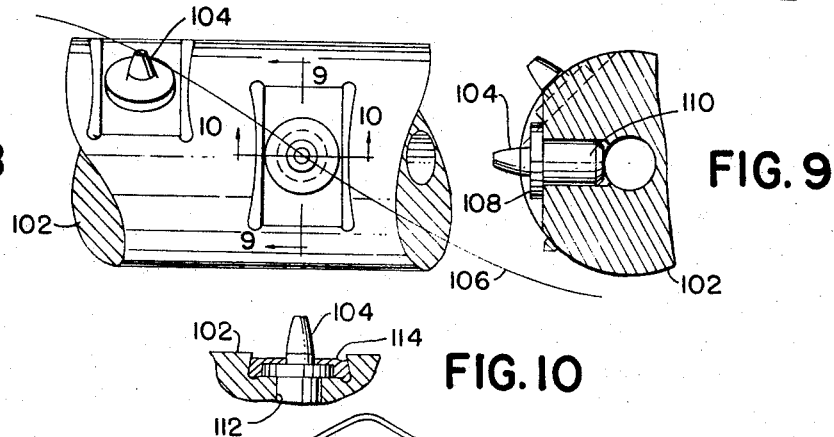
FIGURE 8 is an enlarged fragmentary elevational view of the wheel trimming mechanism.
FIGURE 9 is a fragmentary section on the line 9—9, FIGURE 8.
FIGURE 10 is a fragmentary section on the line 10—10, FIGURE 8.

Referring now to FIGURES 5, 6 and 7 there is illustrated the outer end of the work spindle 76 and it will be observed that it carries at its outer end a work piece W, an intermediate toothed portion 100, the teeth of which are of the same general configuration and lead as the teeth of the work piece but are slightly smaller so as to remain out of contact with the grinding wheel 26 as the work piece is traversed back and forth under the wheel. In addition, the spindle 76 includes a trimming portion designated 102 which has suitably positioned thereon a plurality of radially projecting trimming elements 104. These trimming elements are of generally conical or ogival configuration having trimming surfaces which are surfaces of revolution about axes extending radially of the axis of the trimming portion 102 of the work spindle 76. These trimming elements, as best seen in FIGURES 8, 9 and 10, are positioned to lie along the appropriate helix angle as indicated by the line 106. Moreover, each of the trimming elements in a cross-section containing its axis has side surfaces conforming to the gear tooth form, normally involute. The trimming elements 104 have the outer trimming surfaces thereof diamond impregnated. The elements include flanges 108 and cylindrical bases 110 which seat into cylindrical openings 112 in the portion 102 of the work spindle. The trimming elements are located with great accuracy and are retained in position by suitable material indicated at 114 which may be a low melting point metal which will hold the trimming elements firmly in position but which may be melted readily at low temperature to provide replacements or rotational adjustment of the trimming elements.

It will of course be apparent that the trimming elements will contact the surfaces of the teeth of the grinding wheel only along generally diametrically opposite relatively narrow zones so that a trimming element may be rotated several times into different positions before it requires replacement or removal.

Referring again to FIGURES 5, 6 and 7, there is illustrated the mechanism which insures that a work gear W when placed on the spindle 76 is locked in position with its teeth in exact helical alignment with the helical array of wheel trimming elements 104. It will be recalled that the portion 100 of the work spindle intermediate the wheel trimming portion 102 and the portion which supports the work gear W is provided with helical teeth of the same configuration and angularity as the teeth of the gear W. It should also be borne in mind that the work gear W when accurately positioned on the end of the shaft is retained in position by an expanding arbor which may be of conventional design.

The mechanism for insuring proper location of the work gear W comprises a lever 120 which is pivoted by a shaft 121 to a hub 122 carried by a bracket 124 mounted on the work spindle casting 64. Lever 120 has a handle 125 by means of which it may be raised into the operative position shown in FIGURE 6, such position being determined by engagement between the pin 126 carried by the lever 120 and the pin 127 carried by the hub 122. Pivoted to ears 128 by pivot means indicated at 130 is a pivot mounting 132 which in turn pivotally supports a yoke 134 by means of a pivot shaft 136. Intermediate the pivot support 132 and the lever 120 is a compression spring 138 and limited rocking of the pivot support 132 and the yoke 134 relative to the lever 120 is permitted by virtue of the limited clearance illustrated between the pivot support 132 and the lever 120 in FIGURE 6.

Referring now to FIGURE 7, there is provided a gauging element 140 which is pivoted between the ears of the yoke 134 by a pivot pin 142. Gauge 140 includes gear tooth sections 144 and 146 adapted respectively to register with the toothed section 100 of the spindle and the work gear W before it has been locked in fixed position by the expanding arbor. With this arrangement it is only necessary for the operator to place the gear W loosely on the expanding arbor and thereafter lift the lever 120 to bring the toothed sections 144 and 146 of the gauge into engagement with the toothed section 100 of the spindle and the gear W. It will of course be appreciated that for high production the spindle will rotate continuously so that it is necessary for the gauge 140 to pick up rotation from the toothed section 100 of the spindle and to impart rotation to the work gear W, and at the same time to adjust it angularly into exact helical alignment with the teeth of the toothed portion 100 of the spindle. When this has been accomplished the expanding arbor is expanded by usual means to clamp the work gear in exactly registered position.

Figure 4:
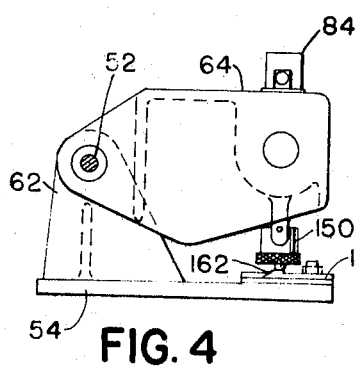
FIGURE 4 is a fragmentary elevational view looking in the direction of the arrow 4—4, FIGURE 1.

It is contemplated that between each gear finishing operation or in some cases between a limited number of operations, relative adjustment will take place between the gear support and the wheel and that this will be accompanied by a suitable trimming of the wheel. In the present instance this adjustment is accomplished by means of an adjustable screw 150 having suitable gauge indicia thereon as indicated at 152, as best seen in FIGURE 3. The screw 150 has an abutment 154 adapted to engage a cam 156 best seen in FIGURE 4. This cam is longitudinally movable from left to right as seen in FIGURE 4, and such movement of the cam is accomplished by a lever 158 pivoted as indicated at 160 to the plate 54. The cam 156 includes an inclined camming surface 162 which when the cam is moved from right to left into the position occupied in FIGURE 4, will serve to swing the work spindle casting 64 upwardly about the pivot axis between the casting 64 and the ears 62. This is the operating position. After a gear finishing cycle the lever 158 is swung to retract the cam 156, permitting the work spindle casting to swing downwardly a small amount in order to provide clearance between the wheel and the work spindle and structure carried thereby. At this time the screw 150 is given a limited rotation so that when the cam is restored to the operative position shown in FIGURE 2, the work spindle casting 64 will be further pivoted in an upward direction and the axis of the work spindle will have been caused to approach the periphery of the wheel by a small increment.

The cycle involves advancing the spindle to the right or left so as to cause a series of the wheel trimming elements 104 to move through and trim the flanks of the teeth 28 on the wheel 26, and thereafter for the work gear W to move through the wheel in trimming relation thereto. For example, with the parts in the relationship illustrated in FIGURE 5, the work spindle casting 64 may be swung upwardly into operative relation by movement of the lever 158, after which the spindle 76 may be moved to the left causing trimming elements 104 to trim the teeth of the wheel 26 and thereafter causing the work gear to move through the grinding zone and to be completely finished. The work gear may be removed by retraction of the expanding arbor upon completion of this stroke, or the lever 158 may be moved to retract the cam and the parts restored to the position illustrated in FIGURE 5 prior to removal of the work gear.

The high production achieved by the grinding machine disclosed herein is of course due to the fact that a work gear or pinion is completely ground in a single pass and moreover, the work gear is rotated at relatively high speed since the wheel 26 is driven at an efficient grinding speed as for example 5000 feet per minute. Rotation of the work gear of course depends upon the number of starts on the wheel but the number of starts is limited so that even providing the necessary slow feed of the wheel through the grinding zone, the work cycle is relatively short.

Figure 12:
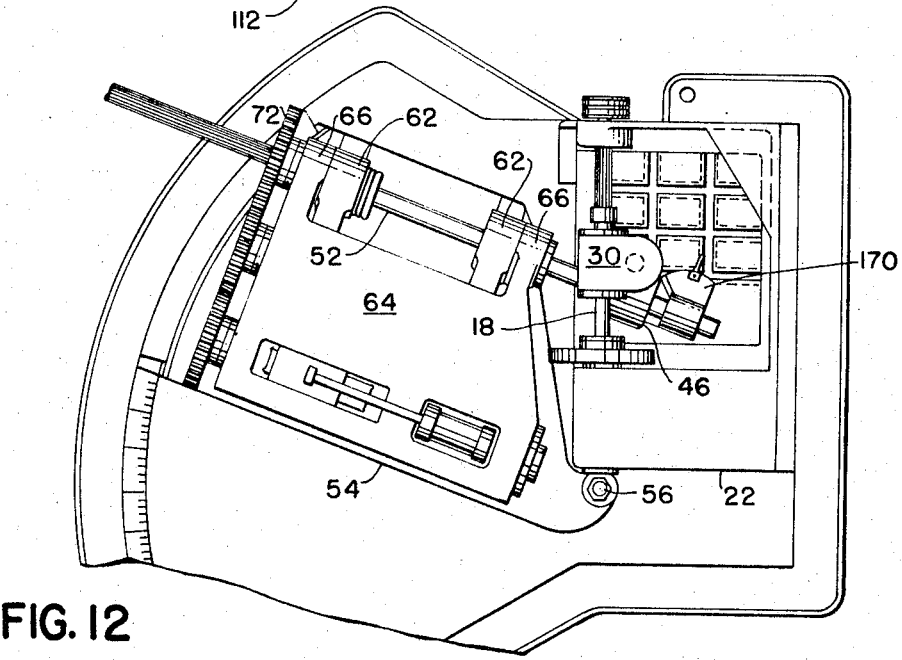
FIGURE 12 is a fragmentary view similar to FIGURE 1 with the parts adjusted to a different relationship.

Referring now to FIGURE 12 the parts shown in FIGURE 1 are illustrated in a different position due to the requirement for increased angularity between the axis of the work gear and the axis of the grinding wheel carried by the shaft 18. Adjustment of the plate 54 has taken place about the axis of the pivot connection 56. This is permitted by virtue of the spline connection of the shaft 52 and the gear 72 as illustrated, and by virtue of the worm and worm gear connections between the gearing in the gear boxes or housings 30 and 46. Thus, the housing 46 is permitted to swing to the angularly displaced position illustrated in FIGURE 12 without disturbing the driving connections of the shafts 18 and 52.

The end of the shaft 52 is supported in an adjustable supporting bracket 170 which may be moved into appropriate position on a slotted surface 172 of the housing 22 and retained in appropriate position by clamping means diagrammatically indicated at 174.

The use of the elongated tapered trimming elements 104 in the relationship disclosed herein is particularly valuable. Since these elements are disposed along the same helical path as the teeth of the work gear, and since the trimming portions of these elements, in cross-section in planes containing their axes are of the same cross-section as the teeth of the work gear, usually involute, it will be appreciated that as the work spindle 76 is advanced and given an angular movement superimposed on its timed rotation in accordance with the lead or helix angle of the gear teeth and trimming elements, the trimming elements will trace in space involute helicoidal paths identical with the involute helicoidal surfaces of the gear teeth, within the limits of accuracy of manufacture and adjustment. Accordingly, the tooth surfaces of the gear wheel will be trimmed precisely to the proper shape and configuration to produce these exact involute helicoids or tooth surfaces.

Since the wheel is trimmed each time by engagement with a plurality of trimming elements which in effect generate a surface conjugate to the surface to be ground on the teeth of the gear wheel, the wheel will be properly trimmed independent of the diameter of the wheel, and accordingly, by making appropriate changes in the speed of rotation thereof, an exceptionally large range of wheel diameter may be employed without requiring any change in the trimming mechanism or in its operation.

It will of course be appreciated that where a number of starts are employed in the wheel, the number will be selected in accordance with the number of teeth in the work gear to produce a hunting relationship.

The drawings and the foregoing specification constitute a description of the improved gear grinding machine in such full, clear, concise and exact terms as to enable any person skilled in the art to practice the invention, the scope of which is indicated by the appended claims.

What I claim as my invention:

1. A gear grinding machine comprising a grinding wheel in the form of a worm, means for driving the wheel in rotation, a work spindle for supporting a work gear in position to mesh with the grinding wheel, means for driving the work spindle in rotation in timed relation to rotation of said grinding wheel, means for feeding the work spindle axially, trimming means on the machine for trimming the grinding wheel between successive grinding operations, the trimming means comprising trimming elements of generally ogival shape carried by and extending radially from a trimming member coaxial and rotatable with the work spindle, and means for providing a relative feed between the wheel and the work spindle and trimming member depthwise of the wheel between successive wheel trimming operations.

2. A machine as defined in claim 1 intended for grinding helical gears comprising means responsive to axial feed of the work spindle to superimpose additional rotational movement thereon to compensate for the helix angle of the gear.

3. A machine as defined in claim 2 in which the helical projections of the finished teeth on a work piece are tangent to opposite sides of said trimming elements.

4. A machine as defined in claim 3, the means for superimposing additional rotation on the spindle in accordance with axial advance thereof being effective to cause said trimming elements to trace involute helicoidal surfaces identical and coincident with the involute helicoidal surfaces of the teeth of a gear properly positioned on said spindle, to generate surfaces on the teeth of said wheel conjugate to the gear.

5. In a gear grinder, a work spindle, means on said spindle for supporting a work gear, a plurality of individual wheel trimming elements on said spindle, each of said elements having a surface of revolution described about an axis perpendicular to the axis of said spindle, and having a cross-sectional shape in a plane containing its axis substantially identical with the normal cross-section of a tooth of the work gear.

6. Apparatus as described in claim 5 in which said elements are disposed in helical alignment with teeth of a work gear positioned on said spindle.

7. Apparatus as described in claim 6 in which said grinder is for use with helical gears comprising means for moving said spindle axially, and means for providing an angular movement of said spindle about its axis in accordance with the helix angle of the gear.

8. Apparatus as described in claim 7 in which said spindle includes means for gripping a work gear, and includes also toothed locating means thereon, and means movable into engagement with said locating means and a work gear loose on said spindle to align the teeth of the gear with said locating means.

9. Apparatus as described in claim 8 in which said gripping means comprises an expanding arbor.

10. Apparatus as described in claim 9 in which said expanding arbor is at the end of said spindle and said locating means is between said arbor and said trimming elements.

11. Apparatus as described in claim 8 in which the means movable into engagement with said toothed locating means and a work gear comprises a pair of gear elements fixed together with the teeth thereof in helical alignment.

12. Apparatus as defined in claim 11 in which said pair of gear elements are rotatable to provide for location of a work gear on said work spindle while said spindle is rotated.

13. Apparatus as described in claim 11 comprising means for swinging said pair of gear elements generally tangentially of the toothed locating means and work gear into mesh therewith.

14. The method of grinding a series of work gears which comprises positioning the work gears on a work spindle having wheel trimming elements extending radially therefrom and occupying helical paths thereon in alignment with teeth on the work gears, rotating a worm-like grinding wheel, rotating the work spindle in properly timed relation to rotation of said wheel to cause the wheel and gears to roll together, moving the spindle axially to cause both the trimming elements and the teeth of the work gears to pass through the tooth spaces of the wheel, superimposing on the rotation of said spindle an angular movement to compensate for the helix angle of the gears, and providing a relative feed depthwise of the wheel before selected passages of the trimming elements through the wheel.

15. A trimmer for a worm shaped grinding wheel having means for driving the wheel in rotation, a spindle disposed at a substantial angle to the axis of said wheel, a trimmer comprising a member coaxial and rotatable with said spindle, a plurality of radially projecting elongated trimming elements on said member, each of said elements comprising an elongated tapered portion of circular cross-section perpendicular to its axis and of generally involute cross-section in planes containing its axis, said elements being disposed to be in helical paths identical with the helices occupied by helical gear teeth to be ground by the wheel, means for driving said spindle in rotation at a speed determined by the speed of rotation of said wheel, means for moving said spindle axially to traverse tooth spaces of the wheel, and means for superimposing upon the rotation of said spindle angular movement to compensate for the helical disposition of said elements.

16. A wheel trimmer for trimming a worm shaped grinding wheel, said trimmer comprising a shaft having a diameter approximately equal to the base circle diameter of a gear to be ground by the wheel, a plurality of elongated outwardly tapered trimming elements carried by said shaft and projecting radially outwardly therefrom, each of said elements being of circular transverse cross-section and having a surface of revolution of involute shape in cross-section containing its axis, said elements being arranged in one or more helical arrays.

17. A gear grinder for helical gears comprising a frame, a grinding wheel spindle, means mounting said spindle on said frame for rotation in a fixed position, a worm type grinding wheel carried by said spindle, motor drive means on said frame connected to said spindle, a work support platform, a work spindle on said platform, an arbor connected to said work spindle for supporting a work gear adjacent said wheel, swivel means mounting said platform to said frame for angular adjustment in a plane parallel to the axes of said wheel spindle and said work spindle and about an axis perpendicular to and intersecting the axes of both of said spindles at said wheel and said arbor, gearing including a splined gear and shaft connecting said wheel and work spindles to maintain a timed relation between said spindles as said platform is adjusted to accommodate gears of different helix angle, a plate pivoted to said work support platform comprising bearing means for said work spindle and arbor, the axis of the pivot connection between said platform and plate being parallel to the axis of said spindle and arbor and disposed laterally therefrom, and cam and abutment means interposed between said platform and plate remote from said pivot connection to provide for movement of a gear on said arbor between a clearance loading position with respect to said wheel, and an accurately located working position.

18. A gear grinder for helical gears comprising a frame, a grinding wheel spindle, means mounting said spindle on said frame for rotation in a fixed position, a worm type grinding wheel carried by said spindle, motor drive means on said frame connected to said spindle, a work support platform, a work spindle on said platform, an arbor connected to said work spindle for supporting a work gear adjacent said wheel, swivel means mounting said platform to said frame for angular adjustment in a plane parallel to the axes of said wheel spindle and said work spindle and about an axis perpendicular to and intersecting the axes of both of said spindles at said wheel and said arbor, gearing including a splined gear and shaft connecting said wheel and work spindles to maintain a timed relation between said spindles as said platform is adjusted to accommodate gears of different helix angle, and a wheel trimmer coaxial and rotatable with said work spindle, said trimmer having diamond carrying wheel trimming elements having surfaces conforming to the shape, normally involute, of the tooth surfaces of the work gear and in helical alignment therewith.

19. A grinder as defined in claim 18 comprising a helically toothed locator coaxial and rotatable with said work gear arbor, and means engageable with a work gear on said arbor and said locator to align a work gear with the wheel trimming elements.

20. A grinder as defined in claim 18 comprising support means mounting said work spindle, arbor, wheel trimmer and locator for limited movement relative to said platform toward and away from said wheel, an adjustable cam and abutment interconnected between said support means and platform, means for relatively moving said cam and abutment to provide for movement of said support means into clearance position between selected gear grinding operations, adjustment of said cam and follower providing for a feed movement of said trimmer and work arbor toward said wheel to position the trimmer and work gear for a wheel trimming operation and gear grinding operation upon axial movement of said trimmer and arbor.

(References on following page)

References Cited

UNITED STATES PATENTS

| | | | |
|---|---|---|---|
| 1,440,338 | 12/1922 | Buswell | 51—288 |
| 1,753,448 | 4/1930 | Smith | 125—11 |
| 2,560,967 | 7/1951 | Lohutko | 51—95 |
| 2,595,591 | 5/1952 | Lohutko | 51—95 |
| 2,623,333 | 12/1952 | Baldenhofer | 51—95 |
| 2,776,529 | 1/1957 | Osplack | 125—5 X |
| 3,299,577 | 1/1967 | Pernack et al. | 51—5 |
| 2,475,902 | 7/1949 | Klomp | 51—95 |

FOREIGN PATENTS

| | | |
|---|---|---|
| 127,815 | 6/1948 | Australia. |
| 356,688 | 9/1931 | Great Britain. |
| 224,704 | 12/1942 | Switzerland. |

LESTER M. SWINGLE, *Primary Examiner.*

U.S. Cl. X.R.

51—95, 277, 287; 125—11